United States Patent
Appleyard

(10) Patent No.: US 11,034,376 B2
(45) Date of Patent: Jun. 15, 2021

(54) STEERING COLUMN ASSEMBLY

(71) Applicant: TRW Limited, Solihull (GB)

(72) Inventor: Michael Appleyard, Cheltenham (GB)

(73) Assignee: ZF Automotive UK Limited

(*) Notice: Subject to any disclaimer, the term of this patent is extended or adjusted under 35 U.S.C. 154(b) by 0 days.

(21) Appl. No.: 16/578,465

(22) Filed: Sep. 23, 2019

(65) Prior Publication Data

US 2021/0001916 A1    Jan. 7, 2021

(30) Foreign Application Priority Data

Nov. 29, 2018 (GB) ..................................... 1819460

(51) Int. Cl.
| | |
|---|---|
| *B62D 1/181* | (2006.01) |
| *B62D 1/11* | (2006.01) |
| *B62D 1/183* | (2006.01) |
| *B62D 1/187* | (2006.01) |
| *B62D 1/19* | (2006.01) |

(52) U.S. Cl.
CPC ............... *B62D 1/181* (2013.01); *B62D 1/11* (2013.01); *B62D 1/183* (2013.01); *B62D 1/187* (2013.01); *B62D 1/195* (2013.01)

(58) Field of Classification Search
CPC . B62D 1/185; B62D 1/19; B62D 1/11; B62D 1/183; B62D 1/181
See application file for complete search history.

(56) References Cited

U.S. PATENT DOCUMENTS

| | | | |
|---|---|---|---|
| 5,115,691 A | 5/1992 | Beauch | |
| 6,068,295 A | 5/2000 | Skabrond et al. | |
| 2001/0035642 A1 | 11/2001 | Gotz et al. | |
| 2006/0053933 A1* | 3/2006 | Gaeth | B62D 1/185 74/492 |
| 2009/0308189 A1* | 12/2009 | Tomaru | B62D 1/181 74/89.42 |
| 2017/0113711 A1* | 4/2017 | Matsuno | B62D 1/195 |
| 2018/0029628 A1* | 2/2018 | Sugishita | B62D 1/185 |
| 2019/0111960 A1* | 4/2019 | Freudenstein | B62D 1/181 |
| 2019/0210632 A1* | 7/2019 | Derocher | B62D 1/183 |
| 2019/0225255 A1* | 7/2019 | Ishimura | B62D 1/192 |
| 2020/0189646 A1* | 6/2020 | Davies | B62D 1/185 |
| 2020/0207402 A1* | 7/2020 | Fricke | B62D 1/195 |
| 2020/0331513 A1* | 10/2020 | Bayer | B62D 1/185 |
| 2020/0339179 A1* | 10/2020 | Nozawa | B62D 1/181 |
| 2021/0016820 A1* | 1/2021 | Nozawa | B62D 1/183 |

FOREIGN PATENT DOCUMENTS

GB        2510822 A  *  8/2014  ............. B62D 1/192

* cited by examiner

*Primary Examiner* — Paul N Dickson
*Assistant Examiner* — Mary E Young
(74) *Attorney, Agent, or Firm* — Robert James Harwood

(57) ABSTRACT

A steering column assembly includes a first elongate guide portion, a second portion movably mounted with respect to the first elongate guide portion and a means for attaching a steering wheel to one of the first and second portions. The first elongate guide portion further includes at least two elongate, parallel guide edges and the second portion further includes at least two rollers spaced apart in the longitudinal direction of the elongate guide portion and shaped complementarily to, and engaged with, a first of the elongate guide edges and at least two further rollers, spaced apart in the longitudinal direction of the elongate guide portion and shaped complementarily to, and engaged with, a second of the elongate edges.

20 Claims, 5 Drawing Sheets

STEERING COLUMN ASSEMBLY

CROSS-REFERENCE TO RELATED APPLICATIONS

This application claims priority to UK Patent Application No. 1819460.5, filed on Nov. 29, 2018 the disclosure of which is incorporated herein by reference in its entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moved into a stowed condition during autonomous control of the vehicle in order to maximise the space available within the vehicle and for the steering wheel to be moved into an extended, deployed condition for manual control.

In accordance with a first aspect of the present disclosure, a steering column assembly for a vehicle comprises a first elongate guide portion, a second portion movably mounted with respect to the elongate guide portion and means for attaching a steering wheel to one of the first and second portions, the elongate guide portion comprising at least two elongate, parallel guide edges and the second portion comprising at least two rollers spaced apart in the longitudinal direction of the elongate guide portion and shaped complementarily to, and engaged with, a first of the elongate guide edges and at least two further rollers, spaced apart in the longitudinal direction of the elongate guide portion and shaped complementarily to, and engaged with, a second of the elongate edges.

The present disclosure therefore provides a mechanism for retracting and deploying a steering column assembly into and out of a "stowed" position, and the provision of the guide edges and their associated rollers allows relative movement with minimal or no play.

In a preferred embodiment of the present disclosure, two elongate parallel guide edges are provided, arranged on either side of the axis of travel of the second portion. The two elongate parallel guide edges may conveniently be located at substantially the same lateral distance from the axis of travel of the second portion. Preferably, at least one of the rollers engaged with the first guide edge and at least one of the rollers engaged with the second guide are located at the same longitudinal position in the direction of travel of the second portion. By locating rollers laterally opposite one another, the likelihood of unwanted play can be further minimised.

Preferably, the disclosure further comprises means for loading each roller into contact with its respective guide edge. The second portion may comprise a plurality of internally threaded holes, the rollers being mounted on respective spindles, each of which is screw-threadedly received in a respective one of the internally threaded holes.

The lateral position of the rotational axis of preferably two of the rollers may be adjustable with respect to its associated guide edge, these said rollers preferably being arranged on the same side of the central axis of travel of the second portion. This assists in "pinching" the guide edges between rollers in contact with the first and second guide edges respectively.

To achieve this adjustment means, two or more of the spindles may each comprise a first outer cylindrical surface which is eccentric with respect to the axis of a second outer cylindrical surface comprised on the same spindle, which may be externally thread, each spindle being rotatably mounted in the second portion of the steering column and the said second portion further comprising means for retaining each spindle in a desired rotational position. The disclosure may further comprise means for displacing the second portion with respect to the first, elongate guide portion.

In one embodiment, the present disclosure further comprises an elongate rotatable threaded member mounted on one of the first and second portions, a nut member mounted on the other of the first and second portions, threadedly engaged with the elongate threaded member and being non-rotatable with respect to the portion on which it is mounted, and means for rotating the elongate threaded member. By rotation of the elongate rotatable threaded member, the first and second portions can be displaced relative to one another. Preferably, a motor is provided for rotating the elongate threaded member via a system of speed reducing gears. In one embodiment, the elongate rotatable threaded member is mounted on the first, elongate guide portion.

The present disclosure preferably further comprises a column member having means for mounting a steering wheel at one end and pivotally mounted on one of the first and second portions, and further comprising means for adjusting the orientation or inclination of the column member. In this way, the inclination or "rake" of the column member to which a steering wheel is attached can be adjusted.

In order to adjust the orientation or inclination of the column member, the present disclosure may further comprise an elongate non-rotatable threaded member extending between the column member and the portion on which the column member is mounted, a nut member rotatably mounted on the steering column, threadedly engaged with the elongate rotatable threaded member, and means for rotating the nut member. Preferably, a motor is provided for rotating the nut member via a system of speed reducing gears.

In a preferred embodiment, the present disclosure comprises means for mounting the first, elongate guide portion on a vehicle and the means for attaching a steering wheel is mounted on the second portion.

BRIEF DESCRIPTION OF THE DRAWINGS

By way of example only, a specific embodiment of the present disclosure will now be described with reference to the accompanying drawings, in which.

DETAILED DESCRIPTION

Figure 1:
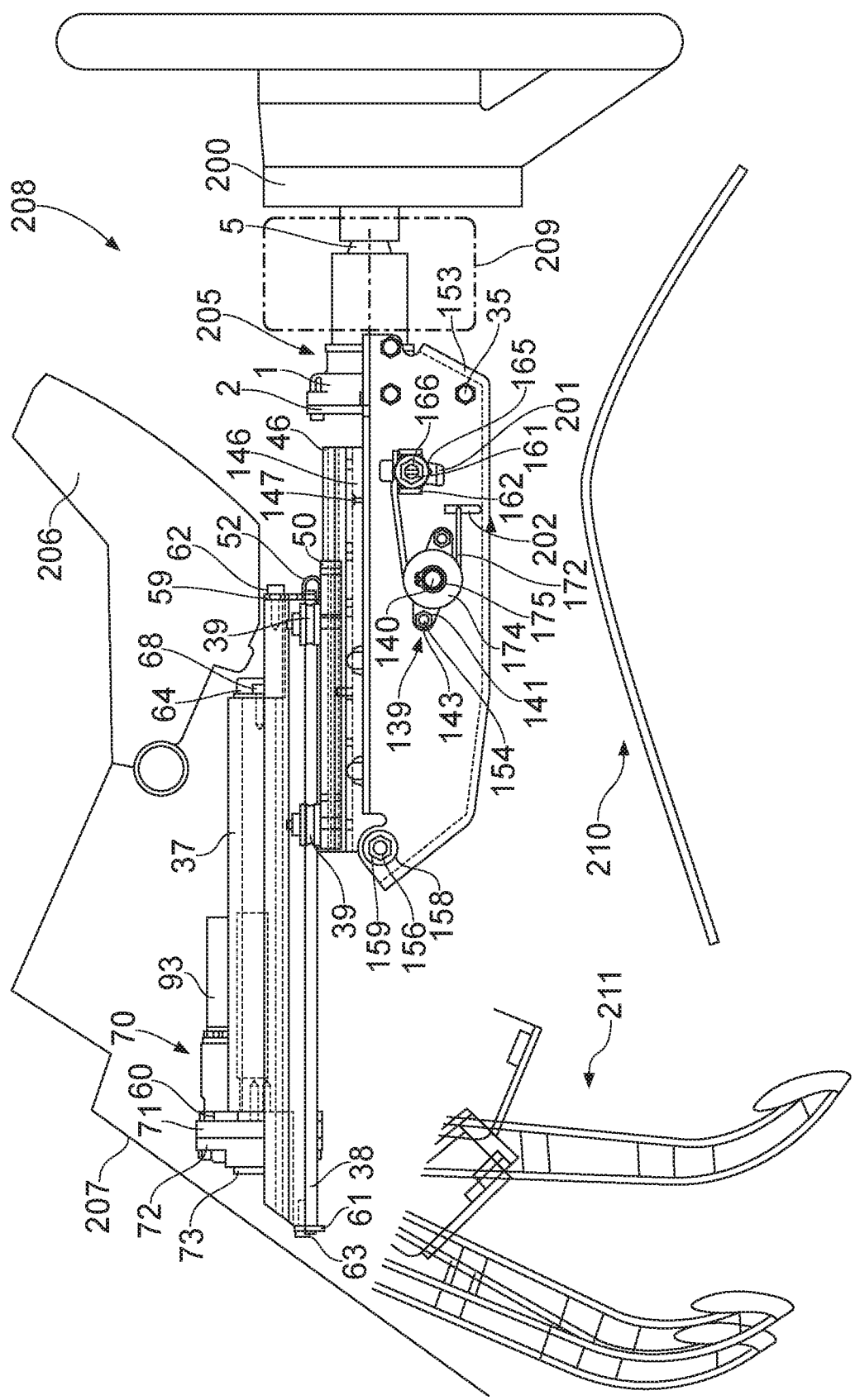
FIG. 1 is a side view of an embodiment of steering column assembly in accordance with the present disclosure.

FIG. 1 is a schematic cross-section through a steering column assembly 208 in which the centreline line axis is shown rotated by approximately 24° clockwise so that the centreline axis of the steering column is horizontal in the drawing, for ease of illustration. The steering column assembly is located between the firewall 207 of the vehicle, a vehicle instrument panel 206, a combi-switch 209 and the knee space 210 below the column assembly 10. The pedals 211 for controlling the vehicle are shown in outline and the steering column assembly is sufficiently narrow to fit between conventionally positioned clutch and brake pedals.

Figure 3:
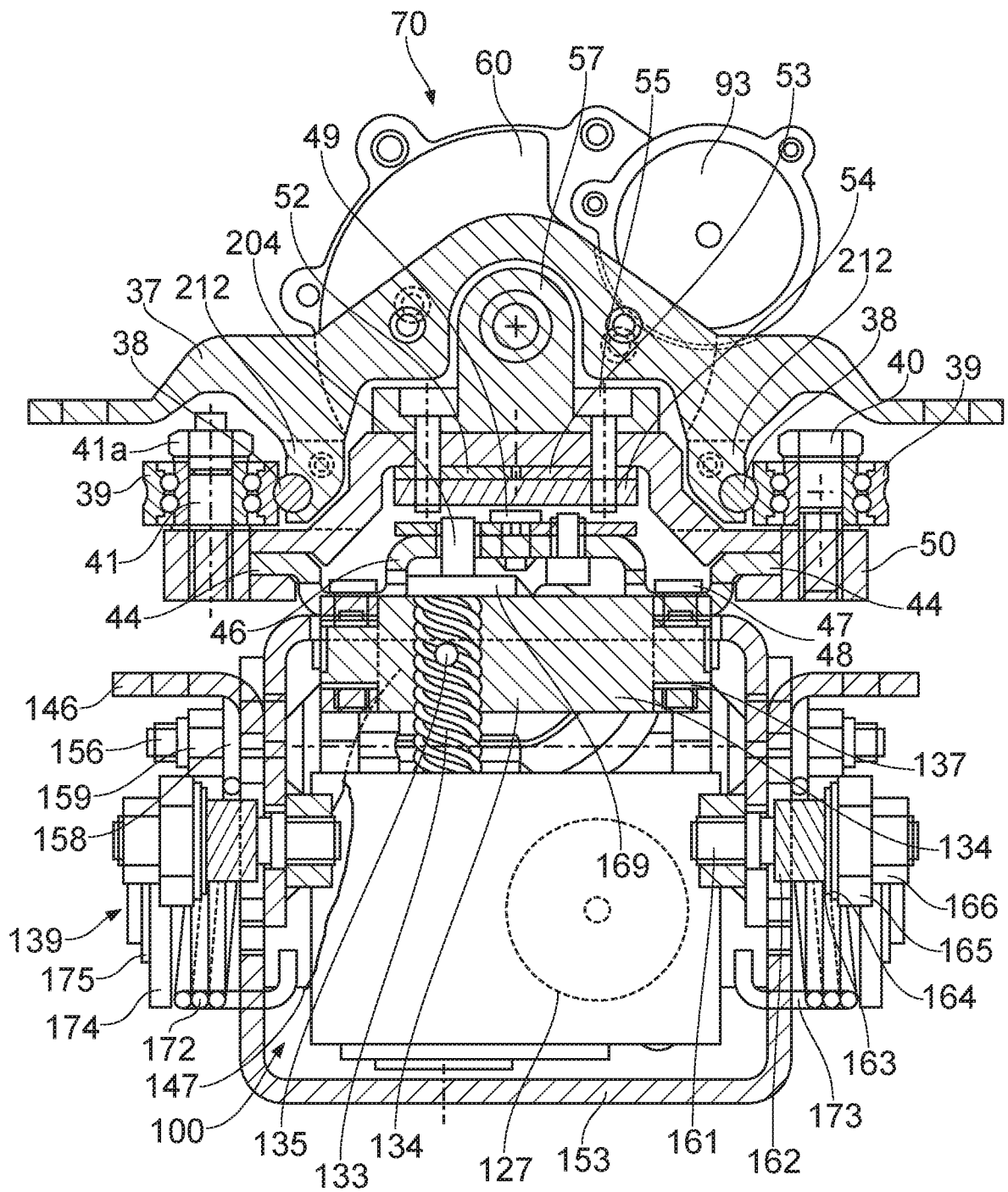
FIG. 3 is an end view of the steering column assembly of FIG. 1, looking in the direction of arrow X in FIG. 2 and showing a stepped cross-section according to the line Y-Y in FIG. 2
Figure 4:
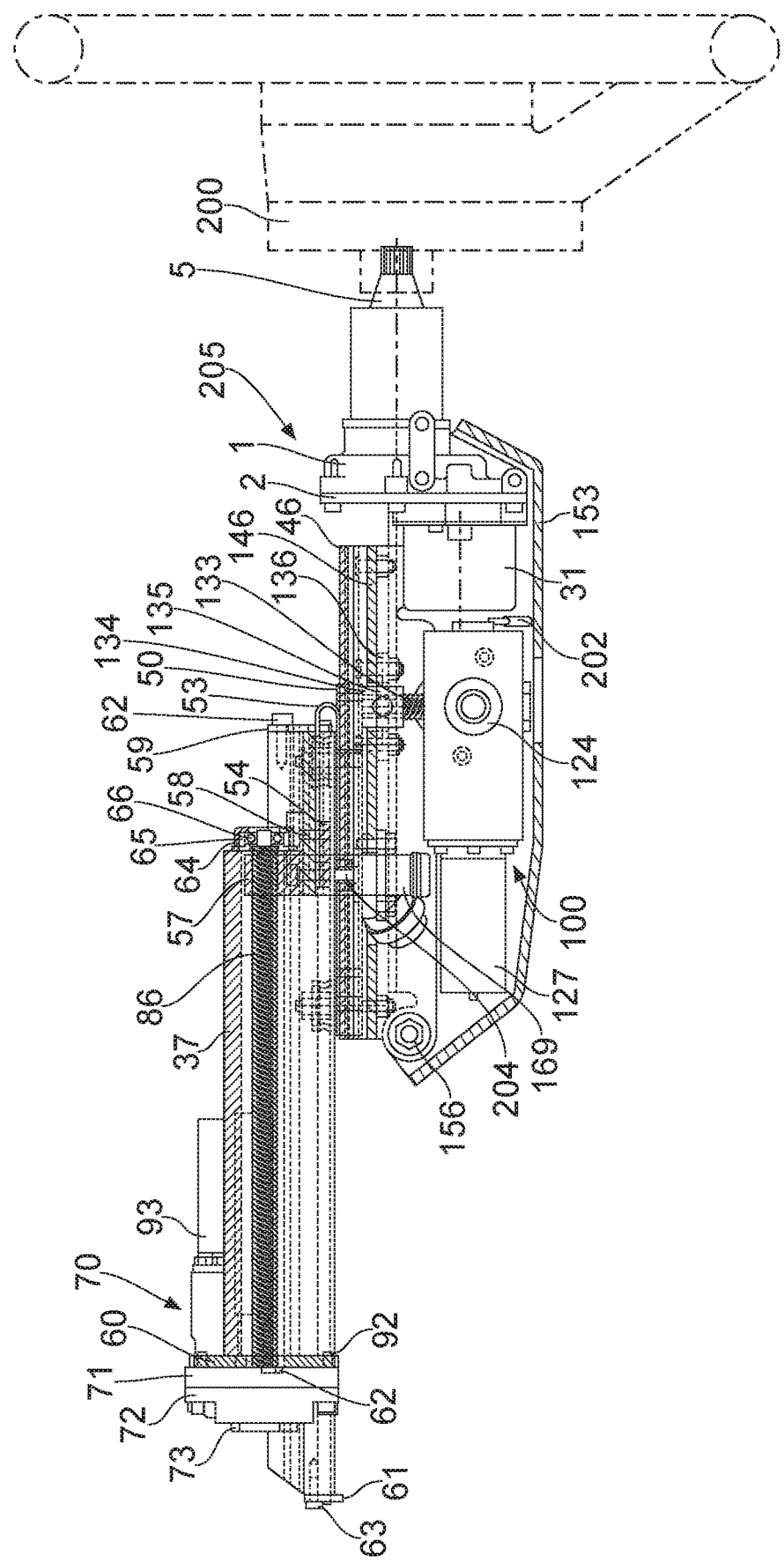
FIG. 4 is a side view of the steering column shown partially cross-sectioned through its central axis, together with the steering wheel feedback actuator not cross-sectioned.

The steering column assembly 208 comprises a mounting bracket 37 secured to the vehicle structure and extending horizontally (in FIG. 1) and rearwardly from a location close to the firewall 207 towards the instrument panel 206. Two parallel guide rails 38 secured to the mounting bracket 37 symmetrically on either side of the centreline of the mounting bracket extend parallel to the axis of the steering column for the length of the mounting bracket 37 and a carriage 50 is displaceable along the guide rails 38, as will be explained. A vehicle steering wheel 200 is mounted at one end of the steering wheel feedback actuator 205 which is in turn mounted to a column housing 153 which is itself mounted to the carriage 50 via a rake bracket 146 and a so-called "crash" plate 46. By displacing the carriage 50 along the guide rails 38 the steering column feedback actuator 205 and the steering wheel 200 can be displaced between a deployed condition shown in full lines in FIG. 1, in which it can be operated by an occupant of the vehicle when the vehicle is in a manual control mode, and a stowed condition which is moved substantially to the left in FIG. 1 for when the vehicle is in an autonomous control mode As best seen in FIG. 3, the outwardly-facing lower lateral edges 212 of the mounting bracket 37 are provided with substantially semi-circular grooves in which are located the guide rails 38 and the carriage 50 is provided with two front and two rear complementarily-grooved rollers 39, each front and rear roller engaging with the circular edge of a respective guide rail 38. The term "complementarily-grooved" means that the profile of the grooves is the inverse of the profile of the lateral edges with which they engage, whereby there is a very close fit between the two with substantially zero play. The front and rear rollers 39 are spaced in the longitudinal direction with respect to the steering axis to maximise the support provided to the steering wheel Each grooved roller 39 is mounted to a vertical spindle 36 by a set of ball bearings each spindle comprising a bolt extending downwardly and being screw-threadedly received into an internally threaded vertical hole 42 in carriage 50. The upper end of each straight spindle 40 is provided with a hexagonal head which allows the roller 39 on that side to be secured to the carriage 50.

The plain and threaded outer cylindrical surfaces of the two spindles 40 on the right-hand side (as shown in FIG. 3) of the carriage 50 are concentric. However, the plain and upper threaded outer cylindrical surfaces of the two spindles 41 on the left-hand side (as seen in FIG. 3) of the carriage 50 are eccentric relative to their lower threaded outer cylindrical surfaces. Therefore, by rotating the left-hand spindles 41, the vertical axes of the left-hand rollers can be adjusted to vary the degree of "pinch" between the left-hand and right-hand rollers.

Once adjusted, the rotational positions of the spindles 41 can be secured by tightening the nuts 41a while restraining the square portions at the top of the spindles 41 from turning. Spacing washers 41b ensure that clearance is maintained above and below the outer rings of the rollers. The guide rails 38, which are shown as items separate from the mounting bracket 37 in the embodiment illustrated, are secured to the mounting bracket 37 by means of holes or slots in end plates 59, 60.

The carriage 50 is displaceable along the guide rails 38 by means of an elongate, externally screw-threaded actuating rod 86 extending parallel to the longitudinal axis of the guide rails 38 and rotatably mounted on the mounting bracket 37 by means of ball bearings at its opposite ends. The rearmost bearing 66 is flexibly mounted to the mounting bracket 37 by means of a rubber sleeve 65 to accommodate small misalignments. The actuating rod 86 is rotatable in both directions by an electric motor 93 mounted on the mounting bracket, to which the actuating rod 86 is connected by means of reduction gearing. The actuating rod is screw-threadedly received in a lead nut 57 which is secured to the carriage 50. The lead nut 57 is unable to rotate and therefore rotation of the actuating rod 86 causes the carriage 50, and therefore the crash plate 46 and the rake bracket 146, to be displaced forwardly or rearwardly, depending on the direction of rotation of the actuating rod 86. The motor 93 and/or its reduction gearing may incorporate a sensor which measures the motor rotation, from which the position of the rake bracket 146 can be calculated. Alternatively, an external linear position sensor may be provided to detect the position of the rake bracket 146.

Two parallel longitudinal U-shaped energy absorption straps 52, 53 are attached (e.g. by welding), at their forward upper ends, to a threaded plate 54 to which the lead nut carrier is connected by screws passing through holes on the carriage 50. Each said strap extends rearward until is folded through 180 degrees and extends forwards again at a lower level.

The lower forward end of each energy absorption strap is tethered to the crash plate 46 via a hole. In the case of the right hand strap 53, the tethering means is a screw 55 which projects upwards through the crash plate and passes through the hole in the strap. This provides a permanent connection. In the case of the left hand strap 52, the tethering means is a retractable pin 204 which passes upwards through a hole in the crash plate 46 and through a corresponding hole in that strap. The retractable pin 204 is part of a pyrotechnic device 169 which can withdraw the pin at high speed in response to a crash sensor signal, thereby rendering one of the energy absorption straps non-functional. This provides two levels of energy absorption to create an adaptive crash the system. A headed pin 49 is fixed (e.g. by welding) to the crash plate 46 between the energy absorption straps in small adjacent corner cut-outs at their ends. The head of the pin 49 overlaps the straps 53, 52 in order to prevent them from lifting off the screw 55 and the retractable pin 204 respectively.

Prior to a crash situation, the crash plate is prevented from sliding along the square grooves 213 in the carriage 50 by shareable elements 44 (e.g. a pair of small diameter pins) which may be formed by injection-moulding a plastic material into aligned cavities in the carriage and the crash plate where they overlap. Once these elements have been sheared by an impact force on the steering wheel (which is transferred to the rake bracket 146, and hence to the crash plate 46, by the of the steering column), the rake bracket 146 and the column housing 153 are able to move forward without being constrained by the screw-threaded actuating rod 86. As the crash plate 46 moves relative to the carriage 50, each energy absorption strap (or only the right hand 53 one if the left hand one 52 is disengaged by a pyrotechnic device) must be deformed such that its fold travels along its length, causing energy to be absorbed in a progressive manner.

The column housing 153 is pivotally attached to the rake bracket 146 by means of horizontally-disposed rake pivot pins 156 and their associated bushings to allow for rake adjustment of the steering wheel 200. The steering column body 153 comprises a substantially U-section pressing to which the steering feedback actuator 205 is fixed using screws 35 which pass through holes 203 in the steering column body.

Figure 2:
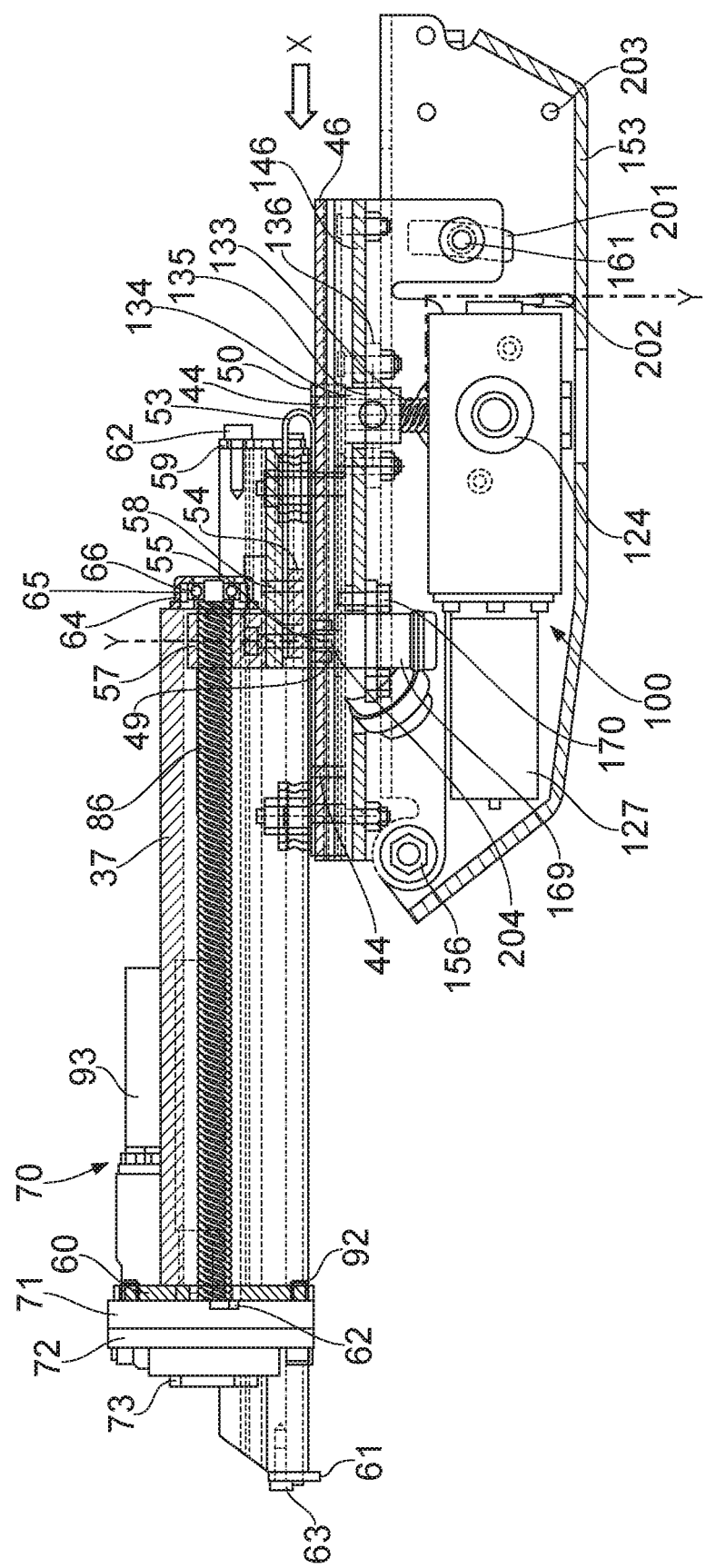
FIG. 2 is a side view of the steering column shown partially cross-sectioned through its central axis.

As shown in FIGS. 2 and 3, rake adjustment is provided electrically by a rake adjust actuator 100 in which an electric motor 127 drives a worm and gear reduction gearbox whose output engages with an internal threaded lead nut which engages with a substantially vertical lead screw 133 extending perpendicularly to the steering axis which is pivotally connected at its upper end to the rake bracket 146 via pivot blocks 136, trunnion block 134 and bushes 137. The rake adjustment actuator assembly 100 is pivotally mounted to the column housing 153 via pins 140 and bushes 124. Actuation of the rake adjust actuator motor 127 causes the steering axis to rise or fall by approximately plus or minus 2.5°, as required.

The rake adjustment actuator motor 127 and/or the gear reduction gearbox may incorporate a sensor to measure the motor rotation in order to calculate the rake position of the steering wheel. Alternatively, an external linear position sensor may be provided in the rake mechanism.

Figure 6:
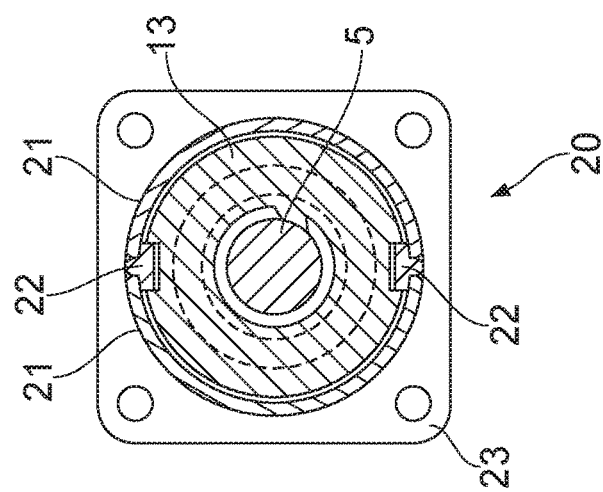
FIG. 6 shows an end view of the steering wheel rotation limiter, cross-sectioned through the plane Z-Z indicated in FIG. 5.
Figure 5:
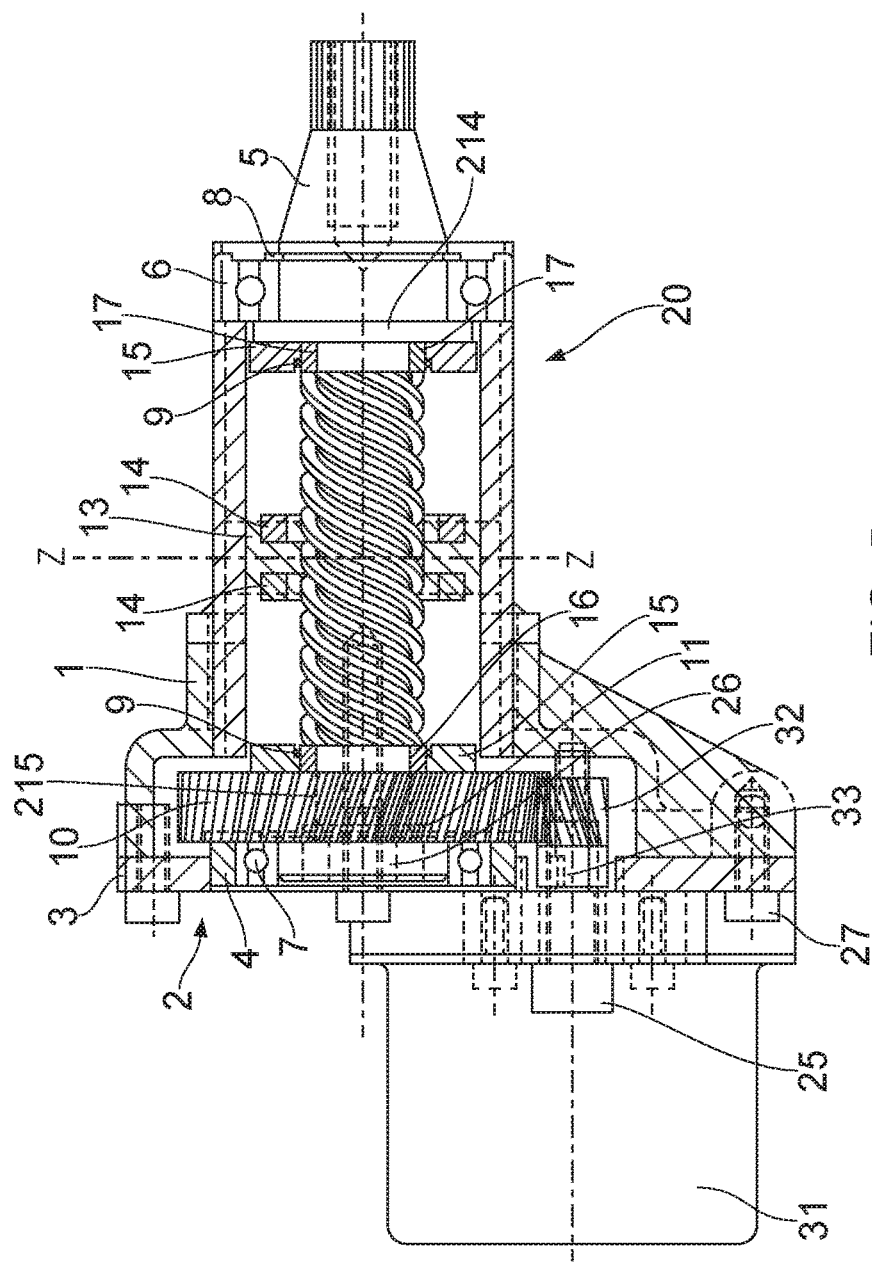
FIG. 5 shows the steering wheel feedback actuator partially cross-sectioned through the central axis.

FIGS. 5 and 6 show cross-sectional views of the steering feedback actuator 205 which comprises an electric motor 31, reduction gears 32, 10 and a steering wheel rotation limiter mechanism which is located inside the column tube 20. The shaft 5 is not shown sectioned in FIG. 5. In order to limit the rotations of the steering wheel, the shaft which supports the larger gear 10 and which also mounts the steering wheel 200, has an external lead screw thread along which travels a lead nut 13. The lead nut is prevented from rotating by the engagement of slots in its periphery with longitudinal internal rails inside the column tube. These rails may take the form of separate parts which are attached to the column tube (e.g. by welding, as shown in FIG. 6) or they may be formed integrally with the tube material itself (e.g. by pressing, extruding or forging). Rubber rings 14 may be attached to each side of the lead nut 13 to provide cushioning at the extremes of the steering wheel rotation. These rings 14 bear on first and second low-friction rings 15 which may be made from plastic and which transfer the axial load in the lead nut 13 onto shoulders at either end of the leadscrew thread on shaft 5, the said shoulders comprising an integral feature 214 of the shaft 5 near the steering wheel end and a flat face of the large gear 10 at the other end. The said axial loads, which can be high on occasions, are therefore not transferred to the ball bearings 6,7. The use of low-friction rings 15 reduces the tendency for the lead nut to jam at the extremes of its travel and so the allows the helix angle of the leadscrew thread on shaft 5 to be minimized which shortens its length.

A metal spacer 16 near the gearbox end of the shaft 5 provides a solid shoulder against which to tighten the large gear 10 using screw 26. The large gear 10 transmits torque to shaft 5 via a spline 215. The spacer 17 towards the steering wheel end of shaft 5 comprises a pair of semi-circular parts to enable it to be assembled without obstruction by the leadscrew thread. A first retaining snap ring 9 near the steering wheel end of shaft 5 holds the two parts 17 together as well as keeping the first low-friction ring 15 in position. A second retaining snap ring 9 near the gearwheel end keeps the second low-friction ring 15 in position The disclosure is not restricted to the details of the foregoing embodiment.

What is claimed is:

1. A steering column assembly for a vehicle, comprising:
a first elongate guide portion,
a second portion movably mounted with respect to the first elongate guide portion, and
means for attaching a steering wheel to one of the first and second portions,
wherein the first elongate guide portion further includes at least two elongate, parallel guide edges and the second portion further includes at least two rollers spaced apart in the longitudinal direction of the first elongate guide portion and shaped complementarily to, and engaged with, a first of the elongate guide edges and at least two further rollers, spaced apart in the longitudinal direction of the first elongate guide portion and shaped complementarily to, and engaged with, a second of the elongate edges.

2. A steering column assembly as claimed in claim 1, further comprising two elongate parallel guide edges arranged on either side of the axis of travel of the second portion.

3. A steering column assembly as claimed in claim 2, wherein the two elongate parallel guide edges are located at substantially the same lateral distance from the axis of travel of the second portion.

4. A steering column assembly as claimed in claim 1, wherein at least one of the rollers engaged with the first guide edge and at least one of the rollers engaged with the second guide edge are located at the same longitudinal position with respect to the axis of travel of the second portion.

5. A steering column assembly as claimed in claim 1, further comprising means for loading each roller into contact with its respective guide edge.

6. A steering column assembly as claimed in claim 1, wherein the second portion comprises a plurality of internally threaded holes and the rollers are mounted on respective spindles, each of which is screw-threadedly received in a respective one of the internally threaded holes.

7. A steering column assembly as claimed in claim 6, wherein the lateral position of the rotational axis of a roller on the spindle is adjustable with respect to its associated guide edge.

8. A steering column assembly as claimed in claim 7, wherein at least one of the spindles comprises an outer cylindrical surface which is eccentric with respect to the axis of its associated roller, the spindle being rotatably mounted and the steering column further comprising means for retaining the spindle in a desired rotational position.

9. A steering column assembly as claimed in claim 1, further comprising means for displacing the second portion with respect to the first elongate guide portion.

10. A steering column assembly as claimed in claim 9, wherein the means for displacing the second portion with respect to the first elongate guide portion comprises an elongate rotatable threaded member mounted on one of the first and second portions, a nut member mounted on the other member of the first and second portions, threadedly engaged with the elongate threaded member and being non-rotatable with respect to the portion on which it is mounted, and means for rotating the elongate threaded member.

11. A steering column assembly as claimed in claim 10, wherein the means for rotating the elongate threaded member comprises a motor for rotating the elongate threaded member.

12. A steering column assembly as claimed in claim 10, wherein the elongate rotatable threaded member is mounted on the first, elongate guide portion.

13. A steering column assembly as claimed in claim 1, further comprising a column member having means for mounting a steering wheel at one end and pivotally mounted on one of the first and second portions, and further comprising means for adjusting the orientation or inclination of the column member.

14. A steering column assembly as claimed in claim 13, further comprising an elongate non-rotatable threaded member extending between the column member and the portion on which the column member is mounted, a nut member rotatably mounted on the steering column, threadedly engaged with the elongate non-rotatable threaded member, and means for rotating the nut member.

15. A steering column assembly as claimed in claim 14, wherein the means for rotating the nut member comprises a motor for rotating the nut member.

16. A steering column assembly as claimed in claim 1, further comprising means for allowing the steering wheel to move relative to the vehicle when impacted by the driver in a crash, the means for allowing the steering wheel to move relative to the vehicle comprising a slideable mechanical connection between an elongate member having means for mounting a steering wheel and a member to which a nut member is robustly fixed, the said slideable mechanical connection being designed to constrain the relative movement of the connected parts to being substantially parallel to the axis of the steering column.

17. A steering column assembly as claimed in claim 16, wherein movement at the said slideable mechanical connection is prevented in normal operation prior to a crash by a fusible means which breaks when a defined force is applied at the steering wheel substantially in the forward direction of the vehicle.

18. A steering column assembly as claimed in claim 17, wherein relative movement at the said slideable connection causes the progressive deformation of one or more folded metal strips which are each connected at a first end to an elongate member having means for mounting a steering wheel and at a second end to a member to which the said nut member is fixed each said folded metal strip absorbing mechanical energy as it deforms.

19. A steering column assembly as claimed in claim 18, wherein one or more of the folded metal strips can be mechanically disconnected at one of its ends by a fast-acting means when an appropriate electrical signal is supplied to the said fast-acting means such that the disconnect folded metal strips are not deformed when the steering wheel moves substantially forwards relative to the vehicle in a crash.

20. A steering column assembly as claimed in claim 19, wherein the said fast-acting means is a pyrotechnic device having a pin or latch which moves when the device is actuated.

\* \* \* \* \*